Figure 1:
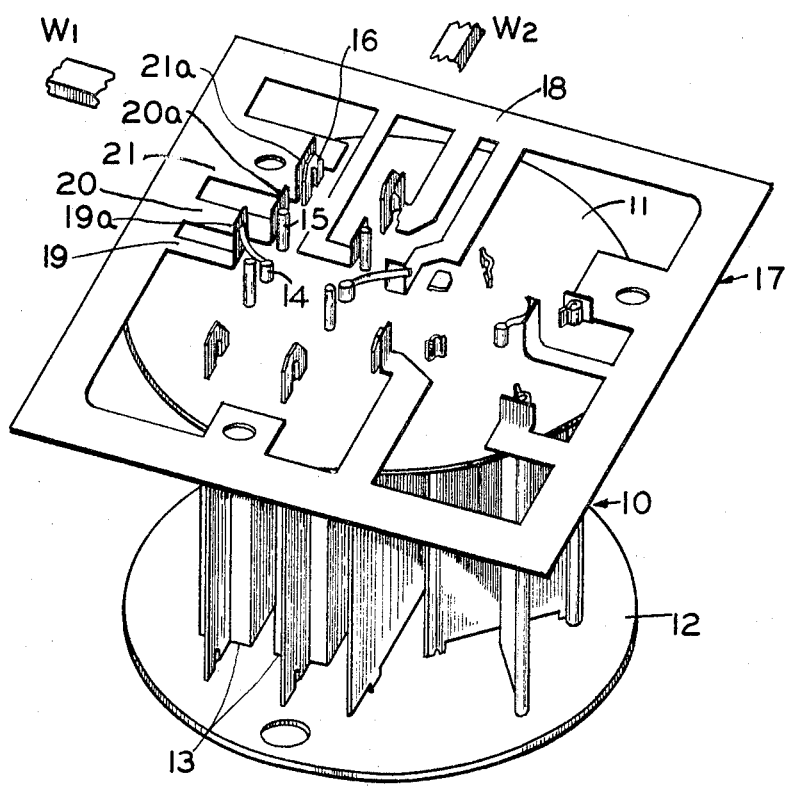

Sept. 6, 1966                F. R. LINEHAN                3,270,391
        ELECTRON DISCHARGE DEVICE ASSEMBLY AND METHOD
                    FOR MANUFACTURE THEREOF
Filed Aug. 31, 1964                              2 Sheets-Sheet 1

*INVENTOR.*
FRANCIS R. LINEHAN
BY
HIS ATTORNEY

INVENTOR.
FRANCIS R. LINEHAN
BY
HIS ATTORNEY

United States Patent Office

3,270,391
Patented Sept. 6, 1966

3,270,391
ELECTRON DISCHARGE DEVICE ASSEMBLY
AND METHOD FOR MANUFACTURE THEREOF
Francis R. Linehan, Owensboro, Ky., assignor to General
Electric Company, a corporation of New York
Filed Aug. 31, 1964, Ser. No. 393,259
5 Claims. (Cl. 29—25.15)

This invention relates to an improved electron discharge device assembly and to the method of manufacturing an electron discharge device to provide the improved assembly.

Present-day electron discharge devices ordinarily include a cage structure comprising an assembly of the electrodes of the device and a stem of insulating material including a plurality of conducting leads secured therein in mutually insulated fashion. A glass or metal envelope is provided which encloses the cage structure and is hermetically sealed to the stem member to provide an evacuated or gass-filled chamber for the cage structure. The conducting leads, hereinafter referred to as stem-leads, are electrically interconnected through the stem to a corresponding plurality of terminal pins which provide for mounting the device in a standard tube socket, the other end of stem-leads, referred to as the inner ends, also being joined, as by welding, to appropriate connector surfaces of the electrodes to enable electrical connection thereto and to provide mechanical support of the cage structure within the envelope.

One of the most costly and most time-consuming operations in the manufacture of an electron discharge device comprises the joining or welding of the stem-leads to the electrode connector surfaces. In accordance with prior art techniques, each of the stem-leads of the stem must be formed, as by bending, to establish an effective positioning thereof adjacent the electrode connector surface to which it is to be joined. Ordinarily, this stem-lead forming can be, and is, accomplished in automated fashion by a machine including a number of dies designed, both in their own shapes, and in their manner of actuation, for achieving the desired forming of the leads. However, the different stem-lead forms required by different tube types necessitates a relatively large, expensive inventory of different dies and actuating mechanisms for the machine for the different tube types. Further, when changing the type of tube being manufactured, a considerable expense, both from the standpoint of down-time and the actual man-hours involved, is involved in the changing of these dies and of their actuating mechanisms for properly forming the stem-leads to accommodate the different configuration of the electrode connector surfaces.

Following the stem-lead forming operations, a taught by the prior art, the stem-leads are welded to the respectively associated electrode connector surfaces by resistance welding. The resistance welding is performed manually by an operator who positions the stem and the cage structure such that they are properly aligned, one with the other, and such that the corresponding stem-leads are adjacent the respectively associated connector surfaces. Next, while maintaining this relationship, the operator positions a selected one of the stem-leads and the corresponding one of the electrode connector surfaces intermediate two welding electrodes which are then actuated to bring the selected stem lead and corresponding connector surface into close mechanical engagement. While maintaining the engagement, current is passed between the electrodes and through the stem-lead and connector surface to provide a resistance weld therebetween. The operator then causes the welding electrodes to be retracted, and manipulates the cage and electrode to perform, sequentially, a resistance weld between each one of the stem-leads and the corresponding one of the connector surfaces of the electrodes.

Despite the prior forming of the stem-leads, the intricacy of the design of the cage structure invariably requires that the operator, additionally, manually form the stem-leads to enable appropriate interconnection thereof with the respectively associated connector surfaces. The intricacy of this resistance welding operation may readily be appreciated by considering the number of welds, i.e., about a dozen, required to be performed in an electron discharge device of the miniature variety which may contain within a single envelope, despite its small size, two or more independent electron discharge systems, such as the well-known double triode and double pentode vacuum tubes.

In accordance with standard mass production techniques, a plant ordinarily will engage in the manufacture of as many as a hundred discharge devices during a period of a month. During this period, an individual operator will be called upon to perform the resistance welding operations of positioning respectively associated stem-leads and connector surfaces intermediate welding electrodes on many tube types. As each type will have a modified stem-lead configuration, to accommodate the changed configuration, the operator must develop a new manner of manipulating the stem and cage structure to achieve the proper and most efficient handling positions thereof in performing the resistance welds. During such a change-over period in the production schedule, an individual operator's production rate ordinarily drops by as much as 50%. This, of course, must be avoided if at all possible since the construction of electron discharge devices requires the utmost in efficiency and maximum work output from each operator in the production line if the maximum benefit to the consumer and to the manufacturer is to be realized.

The prior art has attempted to overcome this problem of stem-lead forming by employing metallic straps which are individually welded to each of the stem-leads and, in turn, welded to the electrode connector surfaces. Although avoiding the stem-forming operation, the use of the straps has proven to be significantly more expensive than the stem-lead forming technique since the straps are an added manipulation problem and, in fact, requires that the operator in the assembly line perform twice as many resistance welds as heretofore. Further, the very basic problem to the operator's drop in output when changing production to a different type of electron discharge device is still present.

The present invention teaches a technique of tube manufacture offering greatly reduced costs, both in assembly equipment, and in operator's time on a production line. The invention comprises both a new method of manufacture for manufacturing electron discharge devices and a new and novel structure which is at least electrically and mechanically equal to those of the prior art and of greatly reduced cost. The method of operation taught by the invention and the resulting structure avoid the requirement that an assembly operator become accustomed to any particular tube type. In particular, the stem-forming operation can be totally avoided, if desired, and the assembly operator can perform the identical assembly steps in an identical manner regardless of the type of device being manufactured. In addition to avoiding the intricate manipulating of the stem and cage structure as required by prior art assembly techniques, the welding operation itself, in accordance with the invention, is much faster, providing a plurality of welds in a single step whereas prior art techniques required the performance of a plurality of welds in a number of successive welding steps.

Thus, in addition to achieving higher production rates while manufacturing a particular device, the output level of each assembly operator will be maintained substantially invarient upon changes in the type of devices being manufactured, and, in fact, in most instances the operator need not even be aware of such a change.

Therefore, it is an object of this invention to provide an improved method for the assembly of electron discharge devices.

Another object of this invention is to provide an improved method for the assembly of stem and cage structures in an electron discharge device.

A further object of this invention is to provide an improved method for the assembly of stem and cage structures of an electron discharge device which eliminates the necessity of stem-lead forming.

Still a further object of this invention is to provide an improved method eliminating the necessity for stem-lead forming and employing percussive welding techniques in the manufacture of electron discharge devices.

It is still another object of this invention to provide an improved method which avoids the necessity of a production line operator becoming acclimated or accustomed to the configuration of a particular type of electron discharge device to assemble the devices quickly and efficiently.

Still a further object of this invention is to provide an improved method for use in the assembly of the stem and and cage structures of an electron discharge device providing higher production levels and reduced cost.

Yet another object of this invention is to provide an improved method for the assembly of electrode cage and stem structures of an electron discharge device wherein an operator's output level remains unaltered upon a change in the production schedule.

It is yet a further object of this invention is to provide an electron discharge device having an electrode cage and stem assembly joined by a percussive welding operation.

It is yet another object of this invention to provide an electron discharge device which can be assembled without the necessity of stem-lead forming.

Other objects and advantages of this invention will be apparent to those skilled in the art and will be made clear as the following description proceeds.

In accordance with one preferred embodiment of the invention, the improved assembly is to be employed with a standard electrode cage providing a plurality of electrode connector surfaces which are to be secured to a corresponding plurality of stem-leads supported by and formed integrally with a stem at the inner ends thereof. The stem comprises a planar insulating member, generally of circular configuration, and the stem-leads are supported thereon in a generally circular array and extend therefrom in mutually parallel fashion. An interconnecting plate of conducting material is formed to provide a plurality of interconnecting bands extending from an associated one of the electrode connector surfaces to a position near the periphery of the interconnecting plate, the positions about the periphery corresponding to selected inner ends of the array of stem leads. A rupture seam is provided in each in that portion of the interconnecting bands adjacent the periphery of the interconnecting plate, whereby the periphery may be removed by breaking along the seam after the stem has been welded to the plate.

In assembling the device, the interconnecting plate with the cage secured thereto may be received by an appropriate support member and the stem, with the stem-leads thereof cut to equal lengths, may be received by a second support member. The stem is positioned such that the stem-leads are displaced from, but axially aligned with, a corresponding one of the interconnecting bands. An electric potential difference is established between the plurality of stem-leads and the inter-connecting plate and these elements are then brought into forging engagement, providing a percussive weld of each of the stem-leads with its respectively associated interconnecting band.

Figure 2:
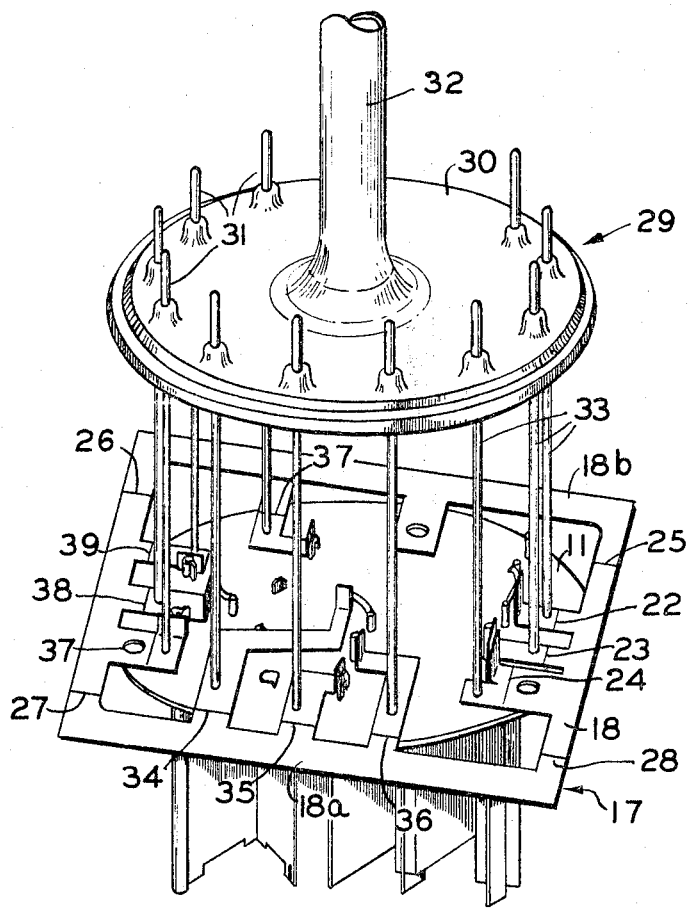

The invention may readily be understood by reference to the following drawings, in which:

FIGURE 1 is a perspective view of a part of an electron discharge device constructed in accordance with the invention, and FIGURE 2 is a perspective view of the assembly of a cage electrode structure and a stem in accordance with the invention.

In FIGURE 1, a cage 10 for an electron discharge device is shown including upper and lower insulating spacers or micas 11 and 12 having securely mounted therebetween a plurality of electrode structures 13. The electrodes of these electrode structures provide a plurality of connector surfaces, the connector surfaces 14, 15, and 16 of the electrodes of one of electrode structures 13 being selected for purposes of description. An interconnecting plate 17 is provided including a plurality of interconnecting bands extending inwardly from a peripheral portion 18, the bands 19, 20, and 21 being selected for purposes of discussion. Rupture seams 22, 23, and 24 (FIGURE 2) are stamped or scored in the plate 17 between each of the interconnecting bands 19–21 and the peripheral portion 18 and rupture seams 25–28 are also provided in the peripheral portion 18 parallel to and adjacent to sides 18a and 18b.

Each of the bands 19–21 includes a transversely extending lip member 19a, 20a, and 21a, respectively, which is to be secured to the associated one of the electrode connector surfaces 14–16. The transversely extending lip members 19a, 20a, and 21a are formed to be parallel to the direction in which the electrode connector surfaces, such as 20 and 21 extend. Further, the interconnecting bands 20 and 21 are designed to be of such a length that the operator may position the lip members 20a and 21a in contiguous relation to the connector surfaces. The operator then performs a plurality of successive resistance welds to provide the completed assembly of FIGURE 1.

Illustratively, welding electrodes $W_1$ and $W_2$ are shown in disengaged positions on opposite sides of lip member 21a and its associated electrode connector surface 16. Electrodes $W_1$ and $W_2$ are moved to a position closely engaging the elements 21a and 16 and a current passed therebetween to provide the resistance weld. Electrodes $W_1$ and $W_2$ are then retracted, to the position shown, and the plurality of other resistance welds are performed in an identical manner in a series of successive steps. Subsequently, a stem 29 (FIGURE 2) is welded to the interconnecting plate 17 in accordance with the percussive welding technique of the invention in the following manner on apparatus which may be similar to that completely disclosed and shown in application (Serial No. 393,304) filed concurrently herewith and assigned to the same assignee.

The stem 29 includes a circular planar insulating member 30 with stem-leads 31 supported therein in a generally circular array extending in a direction parallel to the axis of a tubulation 32 and hence parallel to each other. The stem-leads 31 have been cut to equal length. The stem-leads 31 each include an inner end 33 which, as shown, are already secured to selected interconnecting bands including bands 19–21 in a manner to be now described.

The cage 10 with the interconnecting plate 17 secured thereto will be held, as in a suitable jig or support member, in a selected position. The stem 29 is then positioned as in another suitable jig or support member, so that the selected ones of the inner ends 33 of the stem-leads are aligned with, for example, vertically above, but spaced from the corresponding selected ones of the interconnecting bands, including bands 19–21. An electrical potential difference is established between the stem leads 31 and the interconnecting plate 17 by contacting the plate and the stem-leads with conductors from a source of electrical energy. The stems 29 and the cage 10 with the interconnecting plate 17 thereon are then brought together, as by dropping, with a sharp impact into forging engagement, providing percussive welds between the inner ends 33 and the selected portions of the interconnecting plate 17. The magnitude of the impact and the electrical potential difference between the stem leads 31 and the interconnecting bands is determined in accordance with known percussive welding techniques and depends upon the characteristics of the material of which the stem-leads 33 and the interconnecting plate 17 are formed. To insure the production of good percussive welds, it is preferable to cut the inner ends 33 of stem-leads at a small angle with respect to their axes.

It has been found that the interconnecting plate 17 may be advantageously made of oxidized aluminum-clad nickel material. This material consists of a thin foil or deposit of aluminum covering or clad to a thin nickel sheet. The plate, or the stock from which it is to be formed to, is treated in accordance with well-known procedures to produce thin layer of aluminum oxide on the surface of the aluminum side of the piece. This composite structure is of great advantage since the nickel surface resistance welds to the electrode connector surfaces quite readily and the higher resistance of the aluminum side because the oxide coating greatly enhances the percussion welding of the plate to the stem-leads.

The structure is shown in FIGURE 2 with peripheral portion 18 still attached, each of the stem-leads 33 being joined to an associated one of the interconnecting bands of interconnecting plate 17, by a percussive weld. The interconnecting plate 17 and the cage 10 have been shown, in FIGURE 2, rotated through 180° about a vertical axis from the position shown in FIGURE 1 to provide an additional perspective for indicating the manner of the formation of the lip members and the resistance and percussive welds. As a final step in this assembly process, the peripheral portion 17 of the interconnecting plate 17 are removed by breaking along the rupture seams.

The rupture seams 25–28 provided in the peripheral portion adjacent the two sides 18a and 18b permit breaking off of these two sides simultaneously with the breaking of rupture seams 34–37. Then the other two sides of the periphery 18 may be removed along rupture seams 22–24 and 37–39.

As clearly appears from the foregoing drawings and description of the invention, the highly time consuming and very costly technique of stem-lead forming, as required in the prior art may be totally eliminated through the teachings of this invention. The utilization of a percussive welding technique, as taught by the invention, not only assures the rapid completion of a plurality of individual welds simultaneously, it also avoids the use of resistance welding electrodes and it can totally eliminate the costly, time-consuming step of performing individual resistance welds between each electrode connector surface and an associated stem-lead. One of the primary advantages obtained in eliminating stem-lead forming is that the assembly operators are no longer required to become accustomed to each new electrode configuration, and need not manipulate the device to perform a plurality of resistance welds. Upon a changeover in the production schedule, the assembly operator does not have to become acclimated to a new set of twists and turns in a plurality of intermeshed, intricate stem-leads.

Many modifications and adaptations of the method and the structure manufactured by the method of the invention will readily be apparent to those skilled in the art. Thus, it is intended by the appended claims to cover all such modifications and adaptations as fall within the true spirit and scope of the invention.

What I claim as new and desire to be secured by Letters Patent of the United States is:

1. In the manufacture of electron discharge devices having an insulating stem supporting a plurality of stem-leads of equal, predetermined length in parallel, axial relation thereon and an electrode cage including an electrode structure mounted on an insulating support, the electrodes of said electrode structure including connector surfaces extending through said insulating support wherein selected ones of said stem-leads are to be electrically connected to associated ones of said connector surfaces, a method of assembly comprising:
   (a) cutting said stem-leads to an equal, predetermined length,
   (b) forming a planar interconnecting plate into a configuration providing a plurality of interconnecting bands to be connected to the inner end of said selected ones of said stem-leads and to the electrode connector surface associated therewith and providing rupture seams delineating between said interconnecting bands and a peripheral portion of said interconnecting plate,
   (c) supporting said interconnecting plate in a horizontal plane,
   (d) supporting said stem with said stem-leads depending vertically therefrom and with each of said stem-leads vertically aligned with, and displaced from, said associated ones of said interconnecting bands,
   (e) connecting said selected ones of said stem-leads and said interconnecting plate to a source of electrical energy to establish an electrical potential difference therebetween,
   (f) moving said stem and said interconnecting plate relative to each other to bring said selected ones of said stem-leads into forging engagement with said associated ones of said interconnecting bands to effect a percussive weld therebetween, and
   (g) removing said peripheral portions of said interconnecting plate by breaking said rupture seams.

2. In the manufacture of electron discharge devices having an insulating stem supporting a plurality of stem-leads of equal, predetermined length in parallel axial relation thereon and an electrode cage including an electrode structure mounted on an insulating support, the electrodes of said electrode structure including connector surfaces extending through said insulating support wherein selected ones of said stem-leads are to be electrically connected to associated ones of said connector surfaces, a method of assembly comprising:
   (a) forming a planar interconnecting plate into a configuration providing a plurality of interconnecting bands which will extend from the inner end of each of said selected ones of said stem-leads to the electrode connector surface associated therewith, each of said interconnecting bands being formed to include a lip portion disposed in parallel, axial relation to said associated electrode connector surface, and providing rupture seams between said interconnecting bands and a peripheral portion joining said interconnecting bands,
   (b) resistance welding each of said lip portions to said electrode connector surface associated therewith,
   (c) supporting said electrode cage to position said interconnecting plate in a horizontal plane,
   (d) cutting said stem-leads to an equal, predetermined length,
   (e) supporting said stem with said stem-leads vertically depending therefrom, each of said stem-leads being vertically aligned with, and displaced from, said associated ones of said interconnecting bands,
   (f) connecting said selected ones of said stem-leads and said electrodes of said electrode structure to a source of electrical energy to establish an electrical potential difference between said selected ones of said stem-leads and said interconnecting plate,
   (g) moving said stem member and said electrode cage with said interconnecting plate resistively welded thereto relative to each other to bring said inner ends of said stem-leads into forging engagement with said associated ones of said interconnecting bands to effect a percussive weld therebetween, and (h) removing said peripheral portions of said interconnecting plate by breaking along said rupture seams.

3. In the manufacture of electron discharge devices having an insulating stem supporting a plurality of stem-leads of equal, predetermined length in parallel, axial relation thereon and an electrode cage including an electrode structure, mounted on an insulating support, the electrodes of said electrode structure including connector surfaces extending through said insulating support wherein selected ones of said stem-leads are to be electrically connected to associated ones of said connector surfaces, an interconnecting device comprising a planar interconnecting plate having a configuration providing a plurality of interconnecting bands which will extend from the terminal end of said selected ones of said stem-leads to the electrode connector surface associated therewith, a peripheral portion connecting said bands and rupture seams delineating between said periphery and said interconnecting bands.

4. In the manufacture of electron discharge devices having an insulating stem supporting a plurality of stem-leads of equal, predetermined length in parallel axial relation thereon and an electrode cage including an electrode structure mounted on an insulating support, the electrodes of said electrode structure including connector surfaces extending through said insulating support wherein selected ones of said stem-leads are to be electrically connected to associated ones of said connector surfaces, an interconnecting device comprising a planar interconnecting plate having a configuration providing a plurality of interconnecting bands to extend from a terminal end of each of said selected ones of said stem-leads to the electrode connector surface associated therewith, each of said interconnecting bands including a lip portion to be disposed in parallel, axial relation to said associated electrode connector surface, and rupture seams between said interconnecting bands and a peripheral portion of said interconnecting plate.

5. The device of claim 4 wherein said interconnecting plate is of oxidized aluminum-clad nickel.

References Cited by the Examiner
UNITED STATES PATENTS 2,985,806   5/1961   McMahon _____ 317—235

JOHN F. CAMPBELL, *Primary Examiner.*

WILLIAM I. BROOKS, *Examiner.*